United States Patent
Schlager

(10) Patent No.: US 7,604,728 B2
(45) Date of Patent: *Oct. 20, 2009

(54) ELECTROIONIC GENERATION OF HYDROGEN OR OXYGEN FROM AN AQUEOUS SOLUTION

(75) Inventor: Kenneth J. Schlager, Hartland, WI (US)

(73) Assignee: BioIonix, Inc., Madison, WI (US)

( * ) Notice: Subject to any disclaimer, the term of this patent is extended or adjusted under 35 U.S.C. 154(b) by 485 days.

This patent is subject to a terminal disclaimer.

(21) Appl. No.: 11/278,566

(22) Filed: Apr. 4, 2006

(65) Prior Publication Data

US 2006/0169595 A1 Aug. 3, 2006

Related U.S. Application Data

(63) Continuation-in-part of application No. 10/773,011, filed on Feb. 4, 2004, now Pat. No. 7,033,481.

(51) Int. Cl.
C25B 1/30 (2006.01)
C25B 1/02 (2006.01)

(52) U.S. Cl. .............. 205/466; 206/628; 206/633; 206/637; 206/742; 204/228.3; 204/228.6; 204/229.6; 204/275.1

(58) Field of Classification Search ............. 205/701, 205/466, 742, 628–637; 204/228.3, 228.6, 204/229.6, 275.1
See application file for complete search history.

(56) References Cited

U.S. PATENT DOCUMENTS 4,440,611 A   4/1984   Dhar et al.
5,304,289 A   4/1994   Hayakawa
5,304,302 A   4/1994   Bossert
5,738,766 A   4/1998   Jefferson
5,738,778 A   4/1998   Doring
6,203,710 B1  3/2001   Woodbridge
6,238,546 B1  5/2001   Knieper et al.
6,547,951 B1* 4/2003   Maekawa ............... 205/688
6,780,306 B2  8/2004   Schlager et al.
7,033,481 B1* 4/2006   Schlager et al. ........ 205/701
2002/0056634 A1 5/2002 Pitts et al.
2003/0164308 A1 9/2003 Schlager et al.

OTHER PUBLICATIONS

M. Wagner, D. Brumelis, R. Gehr, Disinfection of Wastewater by Hydrogen Peroxide or Peracetic: Devleopment of Procedures for Measurement of Residual Disinfection and Application to a Physicochemically Treated Municipal Effuent, Water Environmental Research, Jan./Feb. 2002, vol. 74, No. 1, pp. 33 to 45.
L. Scroggs, D. Richard, P. Govea, G. Tchobanoglous, Disinfecting Unfiltered Secondary Effuent Meeting the Challenge with Low Pressure—High Intensity UV Systems, Water Environmental Federation, © 2000, pp. 1 to 23.
H. Dhar, Electrochemical Methods of Prevention of Microbial Fouling, Prevention of Microbial Fouling, Modern Bioelectrochemistry, Chapter 22, Jan. 1986, pp. 593 to 606.

* cited by examiner

*Primary Examiner*—Arun S Phasge
(74) *Attorney, Agent, or Firm*—Alan R. Stewart; Godfrey & Kahn, S.C.

(57) ABSTRACT

The present invention relates to a method of generating hydrogen or oxygen from an aqueous solution within a flow cell by applying a high frequency AC signal to the flow cell. The present invention further relates to an apparatus for generating hydrogen or oxygen from an aqueous solution, and a method of generating hydrogen peroxide in an aqueous solution.

14 Claims, 9 Drawing Sheets

ELECTROIONIC GENERATION OF HYDROGEN OR OXYGEN FROM AN AQUEOUS SOLUTION

CROSS-REFERENCE TO RELATED APPLICATIONS

The present application is a continuation-in-part of commonly owned U.S. patent application Ser. No. 10/773,011, filed on Feb. 4, 2004, the disclosure of which is incorporated herein by reference.

BACKGROUND OF THE INVENTION

Both potable water and wastewater contain microorganisms. Various water treatment systems are provided in the prior art for destroying bacteria and other microorganisms from potable water and disinfecting the water to a level suitable for human and animal consumption. Other water treatment systems treat wastewater by reducing the infectious components to levels which are not suitable for human or animal consumption, but are satisfactory for discharge into various water bodies. Similar water disinfection systems may be applied in both potable water and wastewater applications to reduce the microbial containment level to certain specified governmental standards. Historically, the use of chlorination for disinfection has been pervasive, and in recent years systems employing ultraviolet radiation and ozonation have been commercialized as well.

Various prior art electrochemical processing systems have also been used for disinfection and/or oxidation of potable water and wastewater. These prior art systems include electroporation and electrolytic systems.

Electroporation systems have been used for the inactivation of bacteria from water including wastewater. The technique is generally based on increasing cell membrane permeability using very high voltage electric fields. The water is passed through a disinfection unit having spaced electrodes which are connected to a high voltage source, generally on the order of kilovolts. The high electric field generated changes the permeability of microbial cells and creates a transient, reversible and/or a permanent and irreversible state of increased porosity. The transient condition usually arises at lower values of electric field intensities. The permanent and irreversible state thus is generally operable at much higher levels. Although such systems have been developed, the required high voltage power supply is very costly and also may raise serious safety problems. Electroporation disinfection systems also consume large amounts of electric power. Electroporation systems have disadvantages not only from the cost, but also from the practicality of the system as applied to large water utility and wastewater applications. Further, requirements for large flow cells within closed systems or open channels limit the current state of the art in electroporation systems.

Electroporation employs the use of high voltage pulsed or DC electric fields previously discussed for disinfection is practical only in small, point-of-use applications. For example, the use of prior art treatment with electric fields in the one to ten kilovolt per centimeter range extrapolates to tens, possibly hundreds of thousands of volts required using the water flow routes of existing treatment plants. At the treatment plant level, voltage values and power consumption are significantly large and raise concerns for both safety and cost effectiveness.

DC-based electroporation (Electric Arcing) employs high voltage pulses that destroy microbial cells by increasing cell porosity and permeability. DC-based electroporation is a high-voltage process. DC electroionics electrically generates hydrogen peroxide and other oxidizing agents with direct current-activated electrode action. Both of these DC techniques are characterized by efficient disinfection in small laboratory-scale processes, inefficient disinfection in large-scale processes, and significant electrode contamination after prolonged operation. Both technologies are not efficient or cost-effective in large-scale plant-size operations.

Electrolytic systems employ electrolytic cells that rely on the use of metal electrodes which increase metal concentrations in aqueous solution that sometimes exceed maximum contamination levels for silver, copper, lead or other metals. This toxicity problem has been generally ignored or presented generally without a proper basis for solving the problem particularly in high flow rate systems by most of the prior art, except for U.S. Pat. No. 3,936,364, which provides a second electrolytic cell to remove the toxic metal. The '364 patent, however, does not establish that such metal removal could be accomplished in a cell of reasonable and cost effective size, particularly in high flow rates systems.

The prior art electromagnetic field approaches to wastewater disinfection and/or organics oxidation have failed to achieve the required efficiency levels in large-scale disinfection operations. DC-based systems are also susceptible to electrode contamination. Electroporation systems have found use only in limited, point-of-use applications where small pipe diameters are the rule. However, commercially applicable systems for water treatment plants and large-scale wastewater processing have not found significant application.

Alternate systems based on ionic current flow within water have been used, particularly for limited flow systems such as swimming pools and other like bodies. These systems, however, use metals such as zinc, copper, lead, silver or the like which introduce toxic ions into the water. This approach raises further questions or acceptability and compliance with federal and state chemical contamination limits.

In summary, the prior art has considered the problems of disinfecting water with various electroporative or ionic processes to establish a level acceptable for human or animal consumption and of wastewater for discharge into large bodies of water. It is submitted that such suggested systems cannot operate at the flow rate in channel or pipe sizes required for municipal water/wastewater treatment plants or other high volume applications. Further, the prior ionic disinfection art has universally relied on metal electrodes which introduce undesirable and significant toxic metals into the treated water system, and particularly systems which would not function practically in the channel or pipe sizes at the high rates of flow encountered in modern day community water and wastewater treatment systems.

Therefore, a need exists for a disinfection and oxidation system for both potable water and for wastewater which is operable to remove bacteria and other microorganisms from water and wastewater, which is operable at high rates of flow as encountered for commercial and community water supplies as well as various sizes of wastewater treatment systems.

It is also desirable to utilize as many potentially useful or valuable by-products of such improved apparatus and/or methods of treating aqueous solutions. Production of such by-products may provide an alternative consideration or reason for applying such improved apparatus and/or methods to aqueous solutions.

SUMMARY OF THE INVENTION

The present invention relates generally to the treatment of aqueous solutions to produce a variety of products within the aqueous solution and to extract these products from the solution. More specifically, the present invention relates to a method of generating hydrogen from an aqueous solution by providing a high frequency AC power source coupled to a flow cell. The power source may include a signal generator, a power amplifier and an impedance matching transformer coupled to the power amplifier. The signal generator is used to generate a high frequency AC signal which may be amplified with the power amplifier. The amplified signal may be transmitted to the flow cell to create an electromagnetic field and an ionic current flow in the flow cell. The aqueous solution may be passed the aqueous solution through the flow cell and exposing the aqueous solution to the electromagnetic field and the ionic current flow to generate hydrogen within the aqueous solution.

The present invention further relates to a similar method of generating oxygen within an aqueous solution, and to apparatus for generating hydrogen, oxygen, and hydrogen peroxide from an aqueous solution.

Various other features, objects, and advantages of the invention will be made apparent to those skilled in the art from the following detailed description, claims, and accompanying drawings.

DETAILED DESCRIPTION OF THE INVENTION

Figure 1:
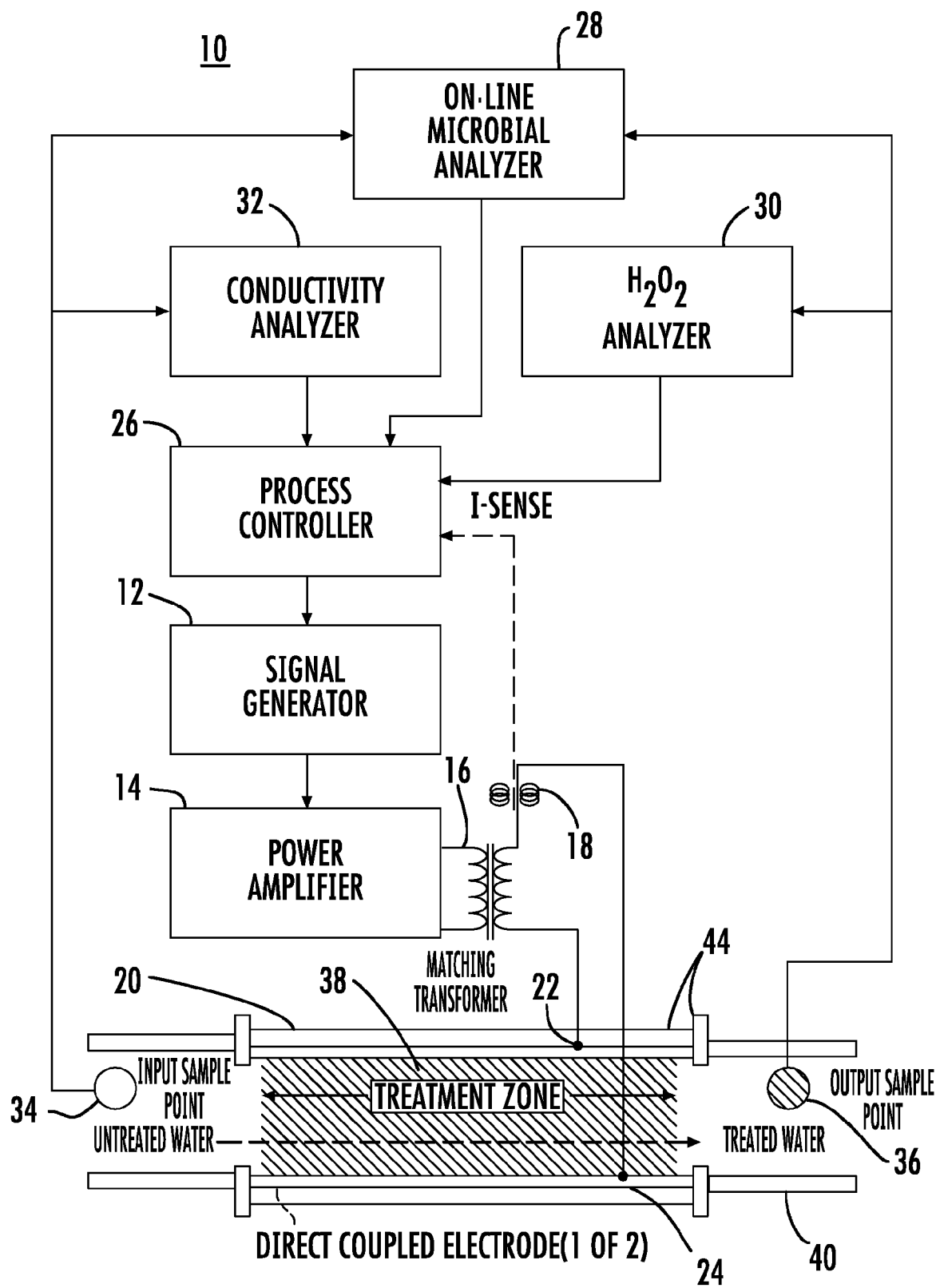
FIG. 1 is a block diagram of a direct-coupled electroionic processing system in accordance with an embodiment of the present invention.

Referring to the drawings and particularly to FIG. 1, a block diagram of a direct-coupled electroionic processing system 10 in accordance with an embodiment of the present invention is shown. The direct-coupled electroionic processing system 10 comprises a high frequency AC power source 12, 14, a treatment cell 20, at least two treatment electrodes 22, 24, a process controller 26, an on-line microbial analyzer 28, a hydrogen peroxide ($H_2O_2$) analyzer 30 and a conductivity analyzer 32. A signal generator 12 supplies a high frequency (20 kHz-450 kHz) signal which is power amplified by a power amplifier 14 for input to an impedance matching transformer 16. Most high frequency power amplifiers require an impedance load in the 50 to 600 ohm range. A current sense coil 18 is also provided to signal the process controller 26 on the current level in the circuit. The current supplied to the treatment cell 20 preferably adapts to varying microbial loads, as detected by the on-line microbial analyzer 28. The current adjustment minimizes the power consumption; and thereby the power costs based on the on-line measurements of coliform bacteria in the aqueous solution to be treated. The on-line microbial analyzer 28 measures the change in coliform bacteria count levels between an input sample point 34 (untreated water) and an output sample point 36 (treated water). While this instrumentation is not necessary for cost-effective wastewater disinfection, it does reduce power usage costs by adjusting circuit levels to changing microbial loads (coliform counts). It also continually insures that the system is performing its disinfection function.

The treatment cell 20 preferably includes a metal frame 44 with electrodes 22, 24 just inside the metal frame 44, and a PVC tube 40 that fits around the frame. The electrodes 22, 24 are preferably made of stainless steel or other material that is corrosion resistant and has a low coefficient of friction. Stainless steel electrodes provide a low cost and highly effective disinfection cell. Stainless steel electrodes do not introduce any damaging toxic ions into the water and operate at reasonably low voltages and currents. The use of stainless steel in an electrolytic configuration generates hydrogen peroxide and hydroxyl radical disinfectants. The electrodes are readily formed with an appropriate area and operable at relatively low current densities such as 20-40 milliamperes/$cm^2$ to obtain a relatively high reduction in bacteria.

The electrodes 22, 24 form the inner wall of the treatment cell 20. Each electrode 22, 24 may be a flat plate having dimensions corresponding to a pipe or open channel configuration. The length of the electrodes is selected in accordance with the maximum flow rate of the water to be processed, the conductivity of the water and the necessary contact time. The disinfection process is the result of the generation of hydrogen peroxide and hydroxyl radicals, which act as oxidizing agents. The electrode length establishes the contact time available for any given flow rate. With the high flow rates of the various drinking water and wastewater treatments, sufficient current density is required to accomplish the required level of disinfection. As noted previously, the contact time required is dependent upon the current density level within the cell and the degree of disinfection needed. The electrode length 26 is therefore based on the flow rate and the necessary current density available.

Electrodes 22 and 24 may also be perforated, which may create essentially the same electromagnetic field as solid electrode plates, resulting in a higher plate resistance and lower power usage as explained below.

The generation of hydrogen peroxide and other chemicals is an inherent byproduct of the electroionic process of the present invention and responsible for the oxidation and disinfection functions performed.

The chemical reaction formulas listed below provide an example of such processes for the production of hydrogen peroxide and hydroxyl radicals used in water and wastewater disinfection and oxidation of organic and inorganic materials.

Chemical Reaction for Hydrogen Peroxide Generation:

$$O_2+2H_2O+2e^- \to H_2O_2+2OH^- \text{ for an alkaline media}$$

$$O_2+2H^++2e^- \to H_2O_2 \text{ for an acid media}$$

Electrons and ions are combined to produce hydrogen peroxide.

Biosolids are generally acidic, below a pH of seven, so the second formula would hold for biosolid applications.

The generation of hydrogen peroxide is the primary vehicle for disinfection of microorganisms in wastewater and potable water. The generation of hydrogen peroxide is generated over the full operational pH range and is a reliable and dependable agent of water and wastewater disinfection.

To be effective as a disinfection or oxidation process, hydrogen peroxide must not only be generated, but controlled. The highest voltage and current do not provide the most efficient $H_2O_2$ production. An optimal voltage for hydrogen peroxide generation exists for a given set of water parameters. Control of the level of hydrogen peroxide generated is very important depending upon the water and wastewater treatment application. In applications such as sludge where long post-treatment storage times are the rule, lower levels of hydrogen peroxide will produce a lower, long term level of microbial content with a hydrogen peroxide residual. Other applications such as disinfection of secondary effluent wastewater or organic oxidation for COD/BOD reduction will require a higher concentration of hydrogen peroxide for quick action and without leaving a hydrogen peroxide residual.

Higher or lower excitation voltages and resulting field strengths will be less efficient producers of $H_2O_2$. Furthermore, control of the level of $H_2O_2$ generated is very important depending on the water and wastewater treatment application. In applications such as sludge wastewater where long post-treatment storage times are the rule, lower levels of $H_2O_2$ will produce a lower, long term level of microbial content with an $H_2O_2$ residual. Other applications such as disinfection of secondary effluent wastewater or organic oxidation for COD/BOD reduction will require a higher concentration of $H_2O_2$ for quick action and without leaving an $H_2O_2$ residual.

Chemical Reaction for Hydroxyl Radical Generation—Fenton's Reagent—Lower pH Environment:

$$F_e \to F_e^{2+}+2e^-$$

$$H_2O_2+F_e^{2+} \to F_e^{3+}+\cdot OH+OH^-$$

Hydroxyl radicals are generated only in limited pH ranges and in the presence of ferrous iron ($F_e^{2+}$). Such hydroxyl radicals are, therefore, not a reliable and dependable agent for disinfection action but only an add-on "bonus" factor when specified water and wastewater conditions or pH and iron content are present. Hydrogen peroxide ($H_2O_2$), in contrast, is generated over the full operational pH range and is, therefore, a reliable and dependable agent of water and wastewater disinfection.

Biosolids also have a high iron content, creating a Fenton's Reagent reaction.

The present invention also provides for the generation of chlorine or bleach. The chemical reaction for chlorine generation and hypochloric acid (bleach), which are also byproducts of the invention are defined as:

$$Cl^- \to \tfrac{1}{2}Cl_2+e^-$$

$$Cl_2+H_2O \to HOCl+HCl$$

The current density level and the contact time of the aqueous solution to the electrodes are important factors in the present invention. The electrodes should be formed having a significant length in the direction of flow to produce the required contact time and reduce the necessary current level in order to produce an adequate disinfection for practical applications. The use of a stainless steel electrodes is considered to provide a very high rate if disinfection in the aqueous solution from a community supplied water or wastewater treatment system having the usual flow rate of such systems. The current density range may vary with the application within a range of substantially 0.2 to 50 ma/cm² in various systems within the scope of the present invention.

The process controller 26 receives inputs from the current sense feed back loop 18, the on-line microbial analyzer 28, the $H_2O_2$ analyzer 30 and the conductivity analyzer 32 for controlling the signal generator 12. The process controller 26 evaluates this input data and regulates the power amplifier 14 to optimize results with minimum energy costs, limit operational decisions, and perform watchdog functions, such as looking for failure conditions, empty treatment zone, etc. Additionally, the process controller 26 preferably includes reporting functions as well.

Figure 12:
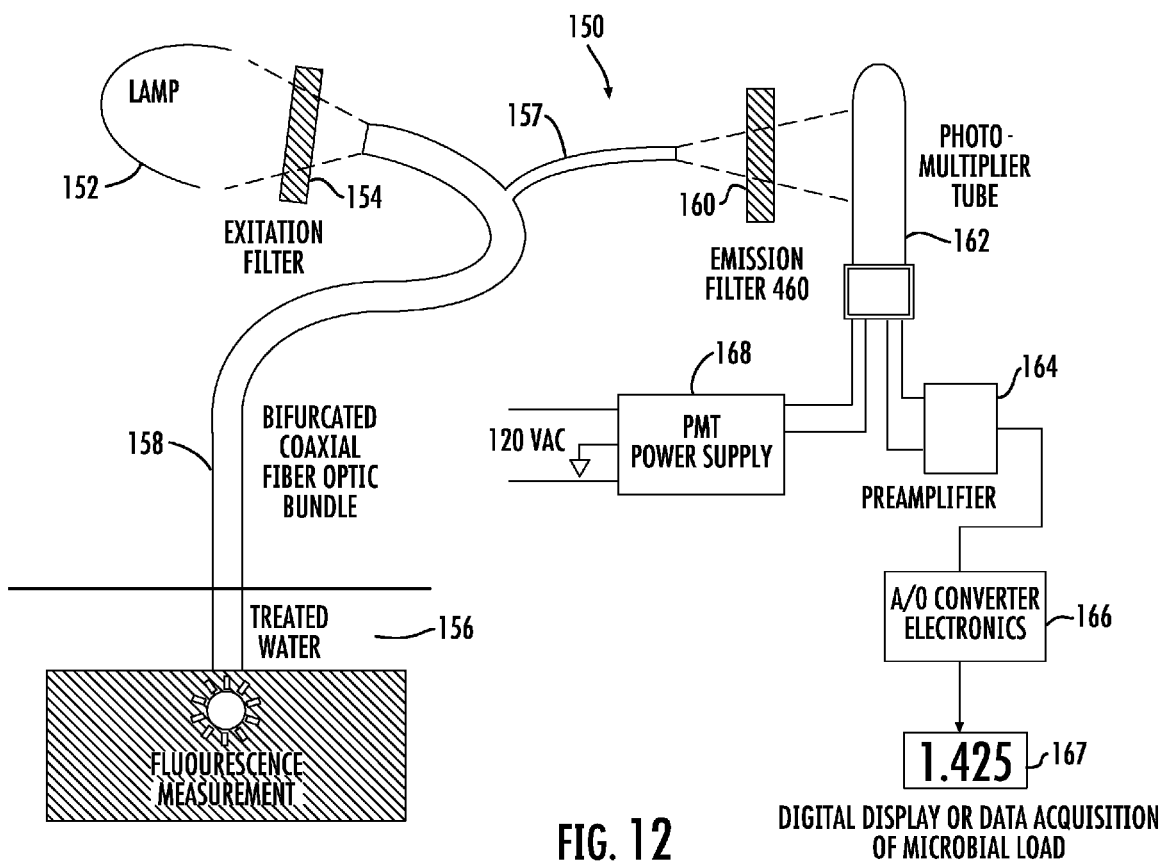
FIG. 12 is a block diagram of an embodiment of an on-line microbial analyzer that may be used in the present invention.
Figure 13:
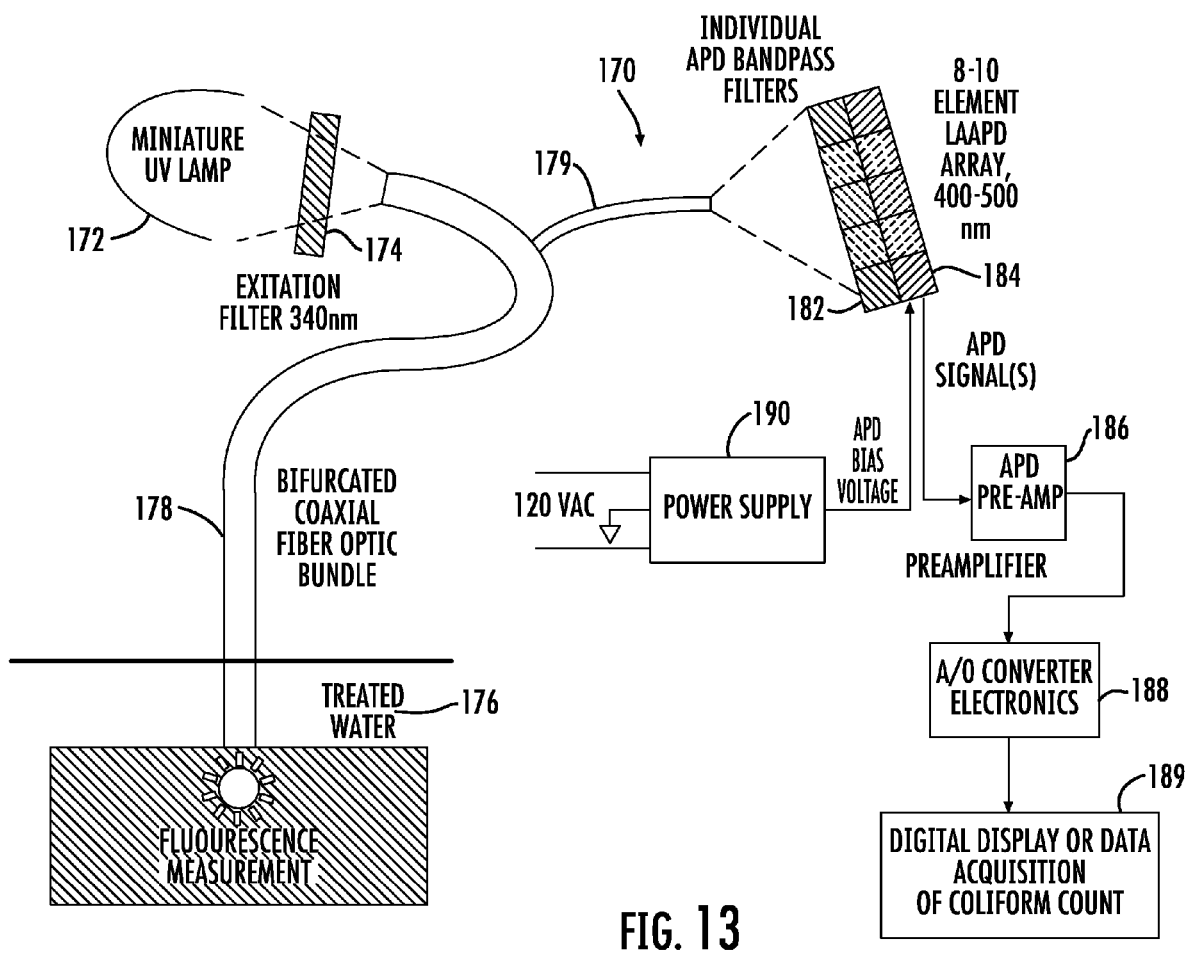
FIG. 13 is a block diagram of another embodiment of on-line microbial analyzer that may be used in the present invention.

The on-line microbial analyzer 28 receives inputs from the input sample point 34 and output sample point 36 of the treatment zone 38 for output to the process controller 26. The on-line microbial analyzer 28 functions to maintain control of the disinfection process. By measuring the outcome of the process (disinfection), the monitor is able to adjust the input voltage and resulting field strength to optimize the disinfection process. Without such process control, effective water and wastewater disinfection or oxidation is not possible. The microbial analyzer 28 is an on-line instrument capable of measuring and controlling a process in real-time. Diagrams of two embodiments of on-line microbial analyzers are shown in FIGS. 12 and 13.

The on-line microbial analyzer 28 provides an indication of the total microbial population density of the aqueous solution being treated. This density in turn is a measure of the microbial contamination of the aqueous solution based on the known relationship between nicotinamide adenine dinucleotide (NADH) fluorescence and microbial population density. The microbial analyzer 28 is preferably coupled to the process controller 26 which controls field strength and current density. As the aqueous solution flows through the treatment zone 38, the aqueous solution is subjected to the electroionic treatment established by the energization of the electrodes 22, 24 and the conductivity of the aqueous solution. The biocidal effect of the ionic treatment generated within the aqueous solution on the bacteria effectively destroys or inactivates such bacteria and other microorganisms or at least reduces the level to that which is acceptable to drinking water. Alternatively, it will treat wastewater similarly to reduce microbial contamination to a level permitting direct discharge into a receiving body of water. Measuring the biochemical compound NADH not only indicates the presence and population density of bacteria, but also their life status (alive or dead) which is the measurement required for electroionic process control.

The conductivity analyzer 32 receives an input from the input sample point 34 of the treatment zone 38 to measure the conductivity of the aqueous solution and provide an output to the process controller 26 for controlling the signal generator 12 and power amplifier 14. Higher levels of conductivity allow for lower power levels to achieve the same current density.

The hydrogen peroxide analyzer 30 receives an input from the output sample point 36 of the treatment zone 38 to measure the amount of hydrogen peroxide in the aqueous solution and provide an output to the process controller 26 for controlling the signal generator 12 and power amplifier 14. The hydrogen peroxide level determines the rate of disinfection.

Figure 2:
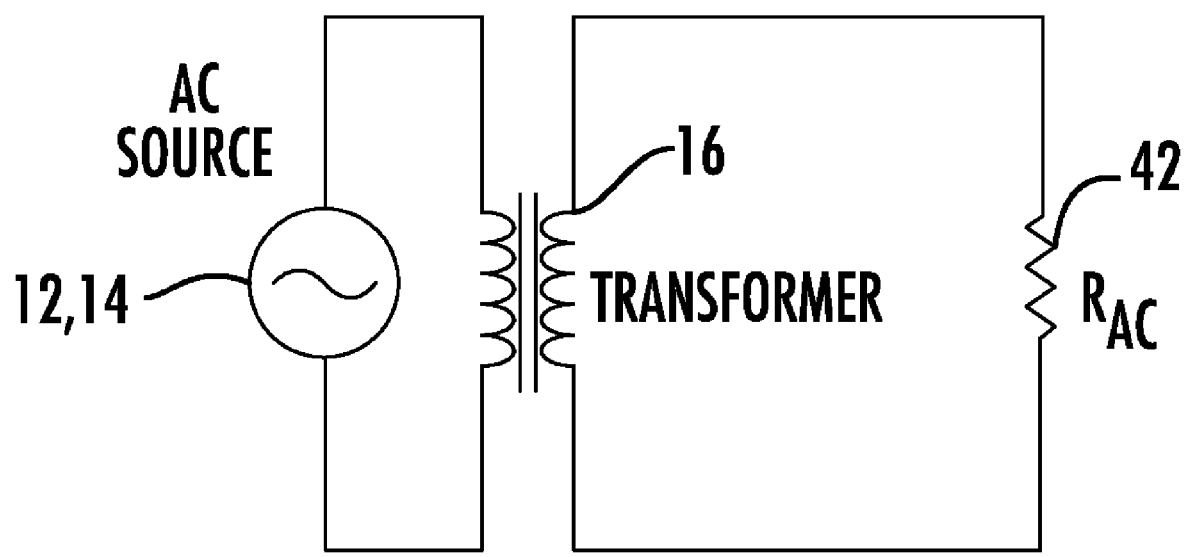
FIG. 2 is a simplified schematic circuit representation of the direct-coupled electroionic processing system of FIG. 1.

FIG. 2 is a simplified schematic circuit representation of the direct-coupled electroionic processing system of FIG. 1. The AC power source 12, 14 preferably provides a high frequency sinusoidal waveform with a frequency in the range of 20 kHz to 450 kHz that creates an electromagnetic field around the treatment cell 20. The equivalent circuit element for the treatment cell 20 and treatment zone 38 is a resistor 42 that represents the resistance of the water.

Figure 3:
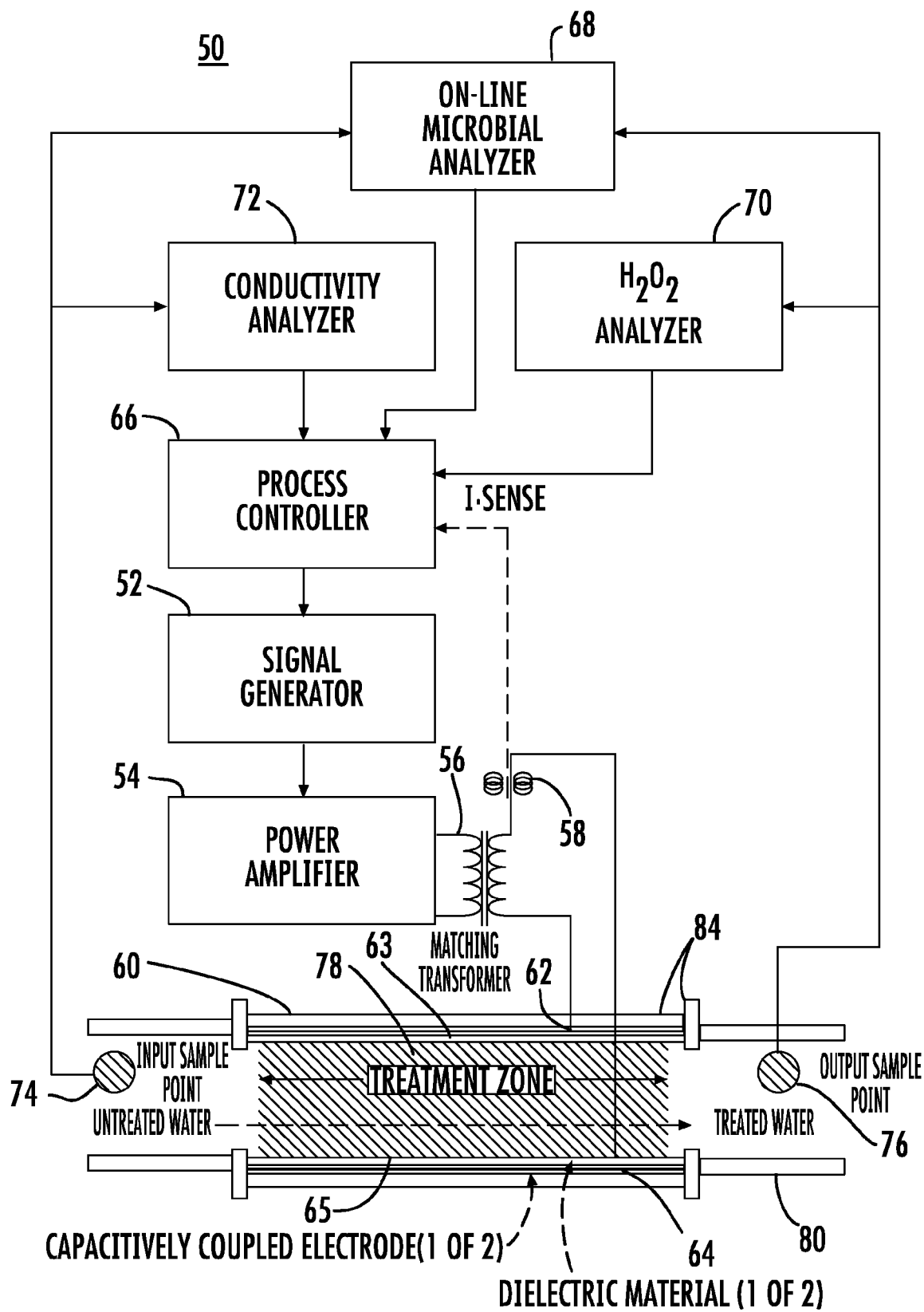
FIG. 3 is a block diagram of a capacitively-coupled electroionic processing system in accordance with another embodiment of the present invention.

FIG. 3 is a block diagram of a capacitively-coupled electroionic processing system 50 in accordance with another embodiment of the present invention. The capacitively-coupled electroionic processing system 50 comprises a high frequency AC power source 52, 54, a treatment cell 60, at least two treatment electrodes 62, 64 with a dielectric material 63, 65 on one surface of each electrode 62, 64, a process controller 66, an on-line microbial analyzer 68, a hydrogen peroxide ($H_2O_2$) analyzer 70 and a conductivity analyzer 72. A signal generator 52 supplies a high frequency (20 kHz-450 kHz) signal which is power amplified by a power amplifier 54 for input to an impedance matching transformer 56. The capacitively-coupled electroionic processing system 50 includes at least two capacitors that capacitively-couple the signal to the load. A current sense coil 58 is also provided to signal the process controller 66 on the current level in the circuit. The process controller 66 will adjust the power based on the inputs from the on-line microbial analyzer, the conductivity analyzer, and the $H_2O_2$ analyzer. The current supplied to the treatment cell 60 preferably adapts to varying microbial loads, as detected by the on-line microbial analyzer 68. The current adjustment minimizes the power consumption; and thereby the power costs based on the on-line measurements of coliform bacteria in the aqueous solution to be treated. The on-line microbial analyzer 68 measures the change in coliform bacteria count levels between an input sample point 74 (untreated water) and an output sample point 76 (treated water). While this instrumentation is not necessary for cost-effective water and wastewater disinfection, it does reduce power usage costs by adjusting circuit levels to changing microbial loads (coliform counts). It also continually insures that the system is performing its disinfection function.

The only difference between the direct-coupled embodiment and the capacitively-coupled embodiment is that the electrodes for the capacitively-coupled embodiment are coated with a dielectric material provides capacitive coupling rather than direct coupling to the load. The treatment cell 60 preferably includes a metal frame 84 with electrodes 62, 64 just inside the metal frame 84, and a PVC tube 80 that fits around the frame. The electrodes 62, 64 are preferably coated on the surface closest the treatment zone 78 with a dielectric material 63, 65. The dielectric coating 63, 65 provides protection against corrosion as well as providing a low coefficient of friction. The dielectric coated 63, 65 electrodes 62, 64 form the inner wall of the treatment cell 60. The preferred dielectric material is Teflon®.

The process controller 66 receives inputs from the current sense feed back loop 58, the on-line microbial analyzer 68, the $H_2O_2$ analyzer 70 and the conductivity analyzer 72 for controlling the signal generator 52. The process controller 66 evaluates this input data and regulates the signal generator power to optimize results with minimum energy costs, limit operational decisions, and perform watchdog functions, such as looking for failure conditions, empty treatment zone, etc. Additionally, the process controller 66 preferably includes reporting functions as well.

The on-line microbial analyzer 68 receives inputs from the input sample point 74 and output sample point 76 of the treatment zone 78 for output to the process controller 66. The on-line microbial analyzer 68 functions to maintain control of the disinfection process. By measuring the outcome of the process (disinfection), the monitor is able to adjust the input voltage and resulting field strength to optimize the disinfection process. Without such process control, cost effective water and wastewater disinfection or oxidation is not possible.

The conductivity analyzer 72 receives an input from the input sample point 74 of the treatment zone 78 to measure the conductivity of the aqueous solution and provide an output to the process controller 66 for controlling the signal generator 52 and power amplifier 54. The power is adjusted to maintain a constant conductivity.

The hydrogen peroxide analyzer 70 receives an input from the output sample point 76 of the treatment zone 78 to measure the amount of hydrogen peroxide in the aqueous solution and provide an output to the process controller 66 for controlling the signal generator 52 and power amplifier 54. The hydrogen peroxide level is monitored continuously by the analyzer.

Figure 4:
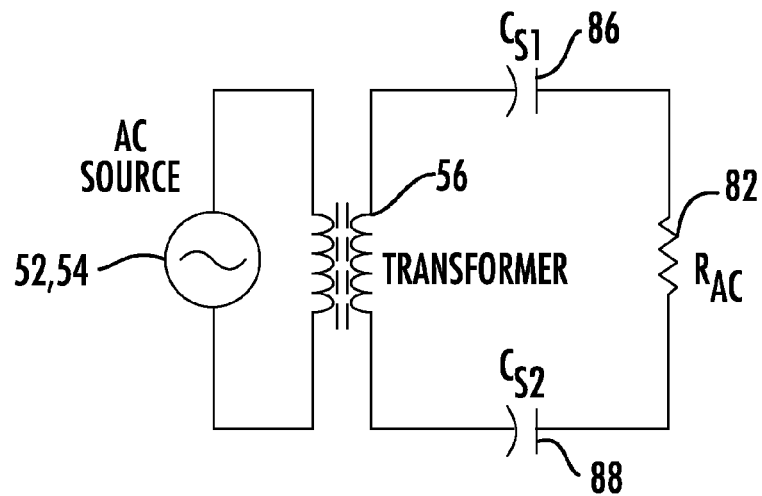
FIG. 4 is a simplified schematic circuit representation of the capacitively-coupled electroionic processing system of FIG. 3.

FIG. 4 is a simplified schematic circuit representation of the capacitively-coupled electroionic processing system 50 of FIG. 3. The AC power source 52, 54 preferably provides a high frequency sinusoidal waveform with a frequency in the range of 20 kHz to 450 kHz that creates an electromagnetic field around the treatment cell 60. The equivalent circuit element for the treatment cell 20 and treatment zone 38 is a pair of capacitors 86, 88 in series with a resistor 82.

Figure 5:
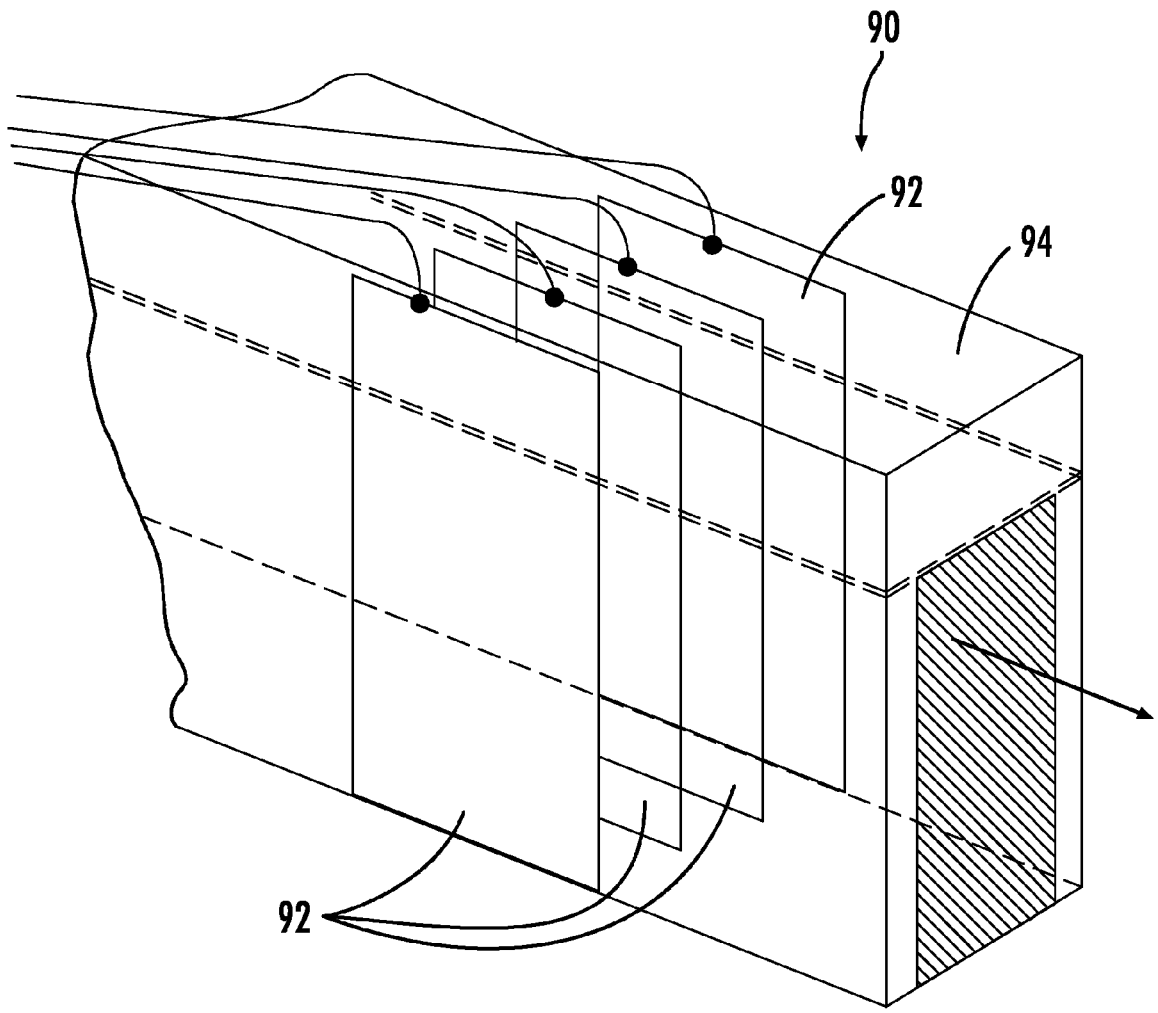
FIG. 5 is a diagram of a multiple plate flow cell assembly for use with the direct and capacitively-coupled electroionic processing system embodiments of the present invention.

The direct 10 and capacitively-coupled 50 electronic processing systems preferably include at least two electrodes, but may include a plurality of electrodes 92 as shown in FIG. 5. FIG. 5 is a diagram of a treatment cell 94 with a plurality of electrodes 92 for use with the direct 10 and capacitively-coupled 50 electroionic processing systems of the present invention. FIG. 5 illustrates a typical wastewater flow cell 90 with the electrodes 92 in place in the treatment cell 94. The electrodes 92 may also include dielectric material coating at least one surface of the electrodes.

A capacitor is formed by the electrode and dielectric on each side of the electrode. One capacitor for each electrode/dielectric interface. The resistance is the resistance of the water between the electrodes.

Figure 6:
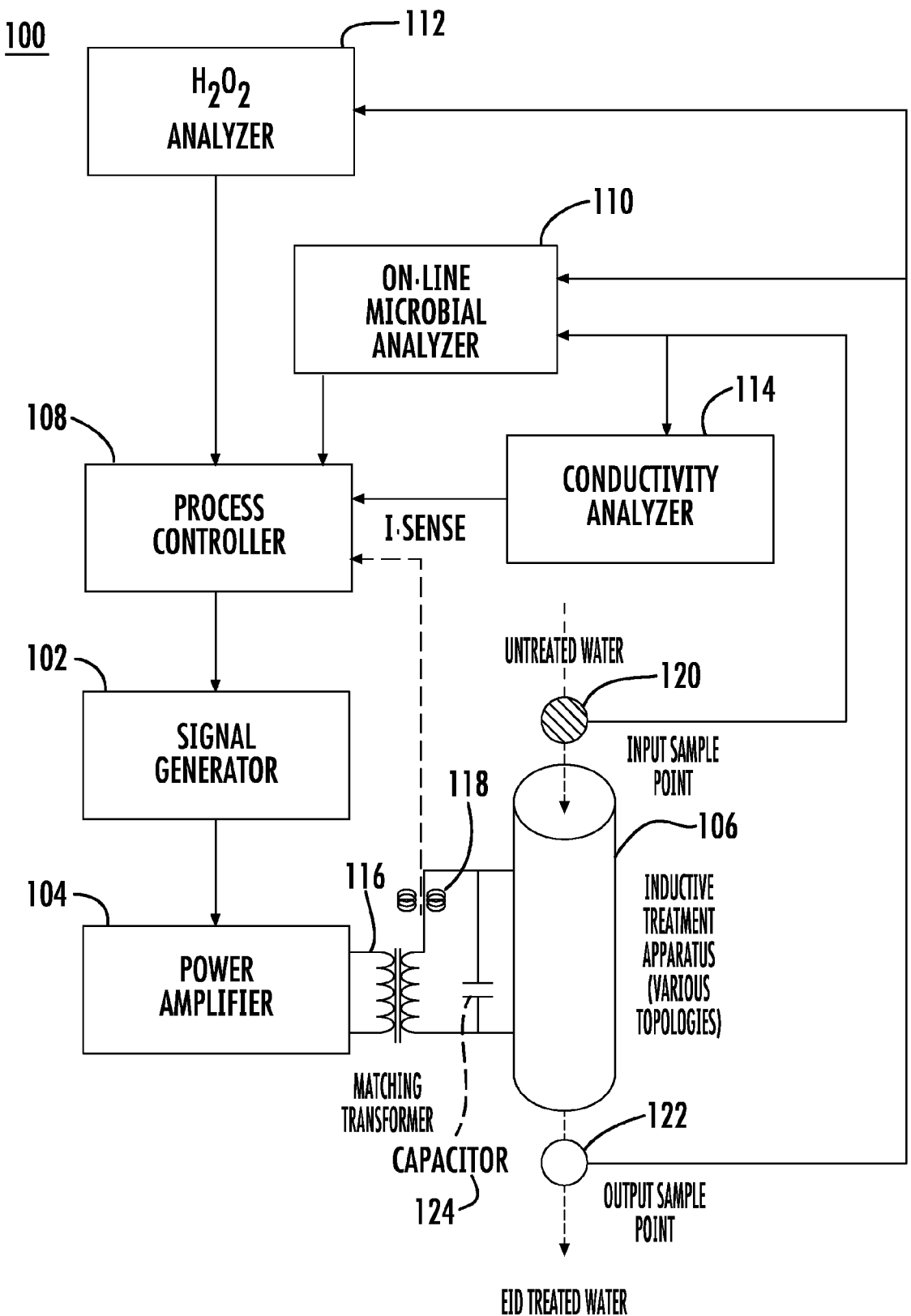
FIG. 6 is a block diagram of an inductively-coupled electroionic processing system in accordance with yet another embodiment of the present invention.

FIG. 6 is a block diagram of an inductively-coupled electroionic processing system 100 in accordance with yet another embodiment of the present invention. The inductively-coupled electroionic processing system 100 comprises a high frequency AC power source 102, 104, an inductive treatment apparatus 106, a process controller 108, an on-line microbial analyzer 110, a hydrogen peroxide ($H_2O_2$) analyzer 112 and a conductivity analyzer 114. A signal generator 102 supplies a high frequency (20 kHz-450 kHz) signal which is power amplified by a power amplifier 104 for input to an impedance matching transformer 116. The equivalent circuit for this embodiment is a series resonant LCR circuit, FIG. 11, which includes an inductor (the coil) 126, a capacitor 124, and a resistor (stray resistance of coil and capacitor) 128. The input impedance to the LCR circuit varies with the application, so that a matching transformer 116 is required to match the circuit elements of the treatment apparatus 106. A current sense coil 118 is also provided to signal the process controller 108 on the current level in the LCR circuit. The process controller 108 will adjust the frequency of the signal generator 102 until minimum current in the circuit is achieved. The current supplied to the treatment apparatus 106 preferably adapts to varying microbial loads, as detected by the on-line microbial analyzer 110. The current adjustment minimizes the power consumption; and thereby the power costs based on the on-line measurements of coliform bacteria in the aqueous solution to be treated. The on-line microbial analyzer 110 measures the change in coliform bacteria count levels between an input sample point 120 (untreated water) and an output sample point 122 (treated water). While this instrumentation is not necessary for cost-effective water and wastewater disinfection, it does reduce power usage costs by adjusting circuit levels to changing microbial loads (coliform counts). It also continually insures that the system is performing its disinfection function.

Advantages of the inductively-coupled method include that there is no contact of the coil and core with the aqueous solution, whereas the direct and capacitively-coupled method each have electrodes in contact with the treatment solution. Also, the inductively-coupled apparatus is better suited for larger installations, because the bigger the radius of the coil, the bigger the field generated, thus the more hydrogen peroxide generated for better treatment.

The following three basic electromagnetic formulas provide the foundation for the inductively-coupled electroionic processing system:

Solenoid Coil Flux Density: $B=\mu NI/l$  (1.)

B=flux density (Tesla)
$\mu$=permeability of medium (henrys/meter)
N=number of turns on solenoid (dimensionless)
I=current (amperes)
l=length of solenoid (meters)

Induced Electric Field: $E=\pi fBR \cos 2\pi ft$  (2.)

E=electric field (volts/meter)
f=frequency of AC field (Hertz)
B=flux density (Tesla)
R=radius of electric field (meters)
t=time (seconds)

LCR Circuit Resonance: $X_L-X_C$  (3.)

$X_L$=inductive reactance
$X_C$=capacitive reactance
Resonant Frequency: $f_o=1/2\pi(LC)^{1/2}$
Current: I=V/R
V=output of matching transformer (volts)
R=resistance of series resonant circuit In order to relate the effect of the AC field to the disinfection process, it is also necessary to determine the current density (J).
J=E$\sigma$
J=current density (ma/cm$^2$)
E=electric field strength (mv/cm)
$\sigma$=conductivity of water or wastewater (Siemens/cm)

A sample set of circuit parameter values was calculated for operation at 400 kHz with a 4.5 inch diameter coil.
l=0.411 meters=16.18 inches
N=300 turns
I=14.37 amps
B (from formula)=$1.312\times10^{-2}$ Tesla
R=$5.7\times10^{-2}$ meters
E=939.7 volts/meter=9.397 mv/cm
$\sigma=2.4\times10^{-3}$ S/cm
J=22.55 ma/cm$^2$ Having determined the induced current density of the electric field, it is necessary to calculate the circuit parameters of the resonant circuit and the matching transformer.

There are two approaches to determining coil inductance (L):
  1. By an approximate formula: $L=N^2 \mu A/l$
  A=cross sectional area of coil
  Other parameters were previously defined.
  2. By measurement:

Using the above formula for the 4.5 inch coil, the calculated L=2.809 millihenries.

Using the Hewlett-Packard Model 4800A Vector Impedance, the inductance was measured as L=2.550 millihenries This measured value was used for the LCR circuit design. The inductive reactance at 400 kHz is then determined by $X_L=2\pi fL$. For f=400 kHz, $X_L$=6409 ohms and $X_c$=6409 ohms.

The capacitor value in the circuit is then determined by $C=1/2\pi fX_c$

C=62.1 picofarads

The input current ($I_{in}$) to the circuit is determined by the inductance and AC resistance of the circuit.
Q=$X_L/R_{ac}$
$I_{in}=I_{tank}/Q$
$I_{in}$=5.36 ma for $R_{ac}$=2.39 ohms—Theoretical value.
$I_{in}$=14.28 ma for $R_{ac}$=6.37 ohms—Extrapolated experimental value.
$I_{in}$=22.40 ma for $R_{ac}$=10.0 ohms—Upper limit value.

The value of $R_{ac}$ was determined by formula and measurement. The formula (Dartmouth/Sullivan) is: $F_r=1+(\pi^2\omega^2 \mu N^2n^2d_c k/768\rho_c^2 b_c^2)$
Where $\omega$=in radians frequency
n=number of Litz wire strands
N=number of coil turns
$d_c$=diameter of copper in each strand
k=1 constant
$\rho_c$=resistivity of copper
$b_c$=window area breadth Resulted in $F_r$ essentially equal to 1.0 indicating that $R_{ac}=R_{dc}$=2.4 ohms.

Power efficiency may be maintained through the use of an impedance matching transformer. At the same level of power usage, voltage may be increased by lowering the current level as controlled by the turns ratio of the transformer. Field strength depends on voltage, not current. A power generator with a high output impedance will produce a higher voltage level for the same power input in accordance with $P=V^2/R$.

The turns ratio on the impedance-matching transformer depends on the Q of the resonant circuit which in turn depends on:
  1. Inductive reactance ($X_L$)
  2. AC resistance ($R_{ac}$)
  Where Q=$X_L/R_{ac}$ The inductive reactance is fairly well estimated at 6409 ohms, but the value of $R_{ac}$ is still uncertain. Based on the Dartmouth Litzwire formulas, it is essentially the same as $R_{dc}$=2.4 ohms. Solatron instrument measurements taken at the University of Wisconsin-Milwaukee, however, indicate an increase in AC resistance at 50 kHz to 2.90 ohms and at 100 kHz to 3.77 ohms. Extrapolating this trend to 400 kHz results in an $R_{ac}$ estimate of 6.37 ohms. Allowing for additional nonlinear effects, a maximum $R_{ac}$ value of 10.00 ohms will be used. Depending on the actual value of $R_{ac}$, the following secondary/primary transformer turns ratios are indicated:

For $R_{ac}$=2.39 ohm, $N_s/N_p$=176:1

For $R_{ac}$=6.37 ohms, $N_s/N_p$=66:1

For $R_{ac}$=10.00 ohms, $N_s/N_p$=42:1

All of the above estimates are based on an output impedance of 600 ohms in the power generator.

Using a minimum of 3 turns on the primary winding the following turns ratios are indicated:

For $R_{ac}$=2.39 ohms, 528:3

For $R_{ac}$=6.37 ohms, 199:3

For $R_{ac}$=10.00 ohms, 126:3

To allow for intermediate values of the parameter estimates, secondary transformer taps are recommended at:

$N_s$=528, 450, 300, 199, 126 and 100

An optimal impedance match will be indicated by the reflected power value at or near zero on the power generator. The proper tap selection should result in near zero reflected power.

The inductively-coupled electroionic processing system provides a very cost effective means of water and wastewater disinfection, which has been experimentally verified.

The inductively-coupled electroionic processing system solves the electrode contamination problem of the prior art, and potentially solves the scale-up problem based on the inductive electric field formula.

$E=\pi f BR \cos 2\pi ft$

With increasing coil radius, the electric field strength also increases, so that scale-up will enhance power efficiency.

Figure 11:
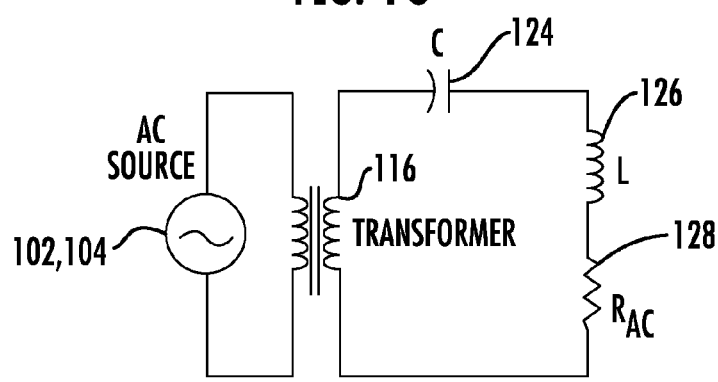
FIG. 11 is a simplified schematic circuit representation of a series resonant circuit for the inductively-coupled electroionic processing system of FIG. 6.

As mentioned above, the equivalent circuit for the inductively-coupled electroionic processing system is a series resonant LCR circuit. FIG. 11 is a simplified schematic circuit representation of a series resonant LCR circuit for the inductively-coupled electroionic processing system of FIG. 6.

The circuit includes an inductor 126 (coil), a capacitor 124, and a resistor 128 (resistance of coil) in series. By tuning the circuit to resonance, the total resistance is tuned to the resistance of the coil, which is very small. A strong field strength requires an inner core of ferromagnetic material. Circuit specifications require fabrication of the capacitor and the coil. The following are design parameters for the capacitor and coil core.

To provide sufficient energy and allow for high voltage charging a fairly large capacitor is required—on the order of 10 microfarads. Maintaining resonance at 400 kHz will then imply a much smaller coil in the range of 158 microhenries instead of the 2.55 millihenries measured above. Such a large reduction in inductance is best accomplished by reducing the number of turns for 300 to 25 or less. Reducing the cross sectional area also reduces the inductance, but such reduction likewise decreases field strength, so that turns reduction is the parameter of interest. The coil must also have a very low resistance to generate sufficient current to induce the required electric field. A set of sample design parameters includes:

C=10 microfarads for 3 kV capacity

L=158.3 microhenries, based on N=2 f=400 kHz

R=6.5 cm=2.56 inches l=4.16 meters

R=0.02 ohms

I=150 kamp

The key to this design is the capacitor. A custom fabricated capacitor needed to be designed because there is not an off-the-shelf capacitor that meets the LCR specifications for parameter range and stability.

Capacitance is defined as: $C=\epsilon A/l$, where C=capacitance (farads), $\epsilon$=permittivity of medium between plates (farads/meter), A=plate area (meter$^2$), and l=distance between plates (meters).

A series of capacitance measurements were carried out using the HP4276 Vector Impedance Meter and various dielectric materials in conjunction with 4×4 inch copper plates.

The formula is sometimes restated as: $C=\epsilon_o \epsilon_r A/l$, where $\epsilon_o$=permittivity of air, $8.854 \times 10^{-12}$ F/m, and $\epsilon_r$ is the relative permittivity of the dielectric. The desired capacitance is between 13 and 15 nF. The precise specifications are determined by experiment.

Figure 7:
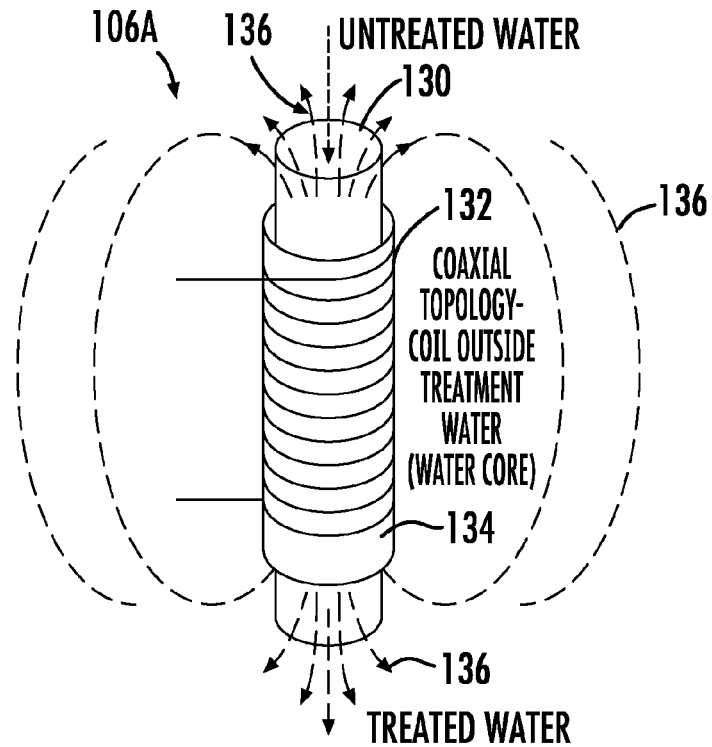
FIG. 7 is a diagram of a first coaxial topology flow cell assembly for use with the inductively-coupled electroionic processing system embodiment of the present invention.

FIG. 7 is a diagram of a first coaxial topology inductive treatment apparatus for use with the inductively-coupled electroionic processing system embodiment of the present invention. The treatment apparatus 106A includes water 130 flowing through an inductive coil 132 (water core) wound around a pipe 134 that encircles the treatment water 130. Electric field lines 136 are shown emanating from the ends of the core 130 and encircling the coil 132.

Figure 8:
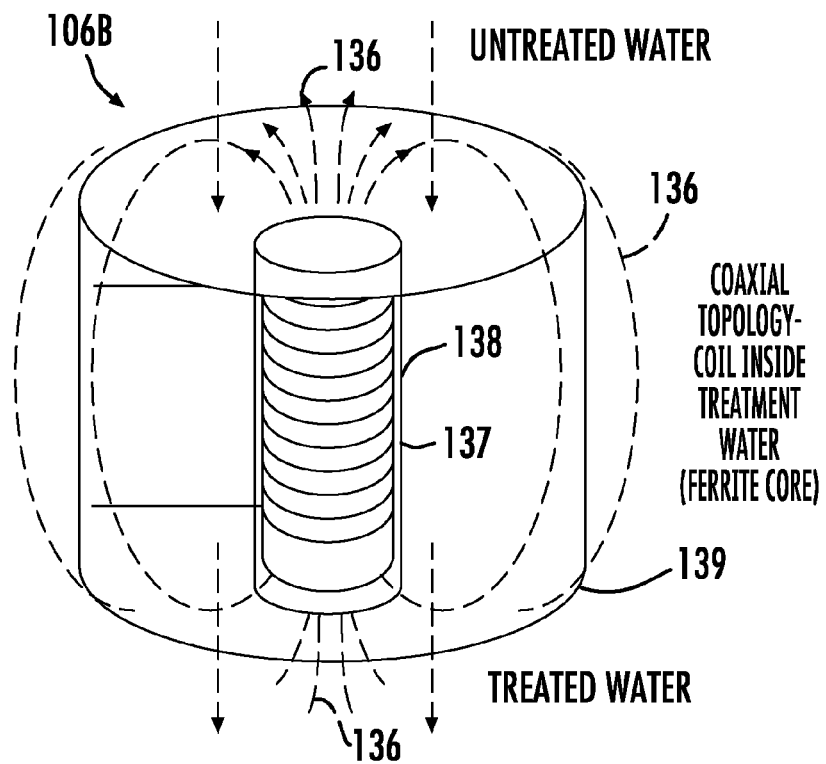
FIG. 8 is a diagram of a second coaxial topology flow cell assembly for use with the inductively-coupled electroionic processing system embodiment of the present invention.

FIG. 8 is a diagram of a second coaxial topology inductive treatment apparatus for use with the inductively-coupled electroionic processing system embodiment of the present invention. The treatment apparatus 106B includes a first pipe 137 with an inductive coil 138 with a ferrite core inserted within the first pipe 137 and a second pipe 139 formed around the first pipe 137 with water flowing around the first pipe 137 and within the second pipe 139. Electric field lines 136 are shown emanating from the ends of the core and encircling the coil.

Figure 9:
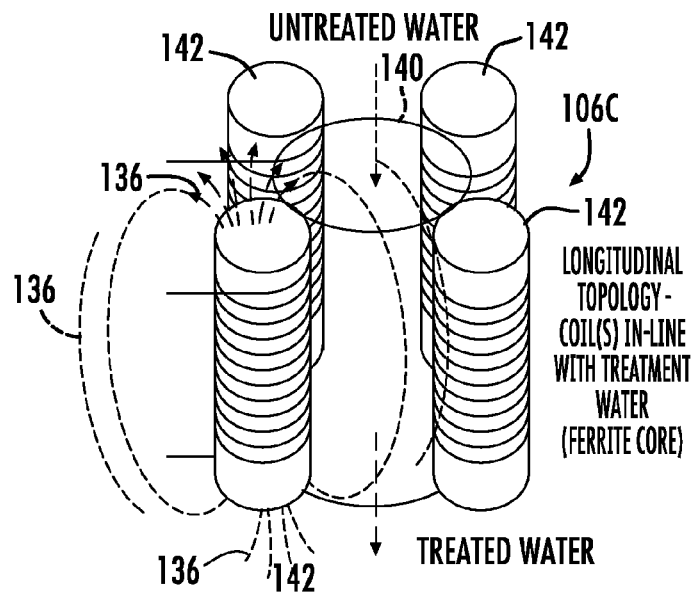
FIG. 9 is a diagram of a longitudinal topology flow cell assembly for use with the inductively-coupled electroionic processing system embodiment of the present invention.

FIG. 9 is a diagram of a longitudinal topology inductive treatment apparatus for use with the inductively-coupled electroionic processing system embodiment of the present invention. The treatment apparatus 106C includes a treatment pipe 140 with water flowing through the pipe and a plurality of inductive coils 142 longitudinally encircling the pipe. Electric field lines 136 are shown emanating from the ends of the cores and encircling the coils. The coils must be in phase so they don't cancel each other out.

Figure 10:
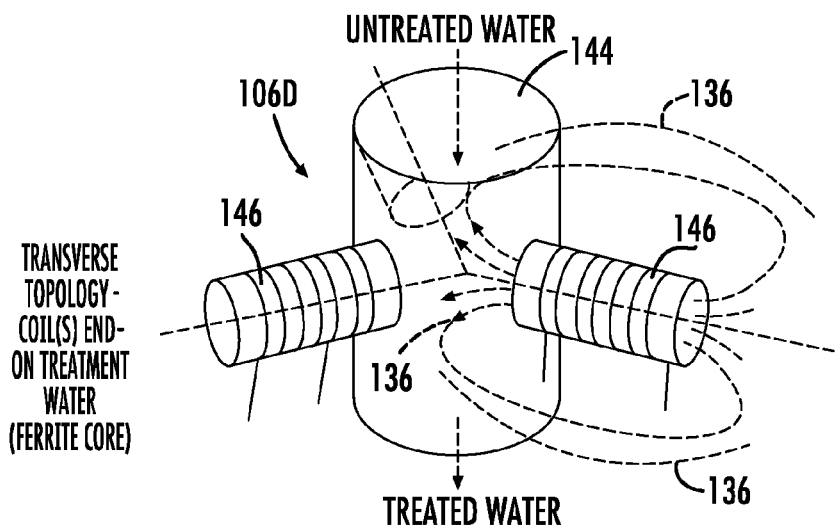
FIG. 10 is a diagram of a transverse topology flow cell assembly for use with the inductively-coupled electroionic processing system embodiment of the present invention.

FIG. 10 is a diagram of a transverse topology inductive treatment apparatus for use with the inductively-coupled electroionic processing system embodiment of the present invention. The treatment apparatus 106D includes a treatment pipe 144 with water flowing through the pipe and a plurality of inductive coils 146 transversely encircling the pipe. Electric field lines 136 are shown emanating from the ends of the cores and encircling the coils.

FIG. 12 illustrates a block diagram of an embodiment of an on-line microbial analyzer 150 to measure the microbial content of the aqueous solution being treated. The analyzer 150 preferably includes a broadband light source 152 such as a low pressure mercury lamp or ultraviolet lamp that transmits through an excitation filter 154. The light travels to the target 156 through a coaxial fiber optic bundle 158, having an outer bundle of transmitted light and an inner bundle of back scattered light from the target 156. The bundle 158 is interfaced to a pipe 159 using a special coupling fixture which allows the bundle to have a water tight seal on the inner surface of the pipe. The analyzer 150 operates by projecting transmitted light into the water target 156. Fluorescent light is back scattered into a receiving inner core of the bundle 158. This light is then transmitted back through the inner core of the bundle to an emissions filter 160 and a photomultiplier tube detector 162. A photomultiplier tube (PMT) detector is used rather than a photodiode detector because the photomultiplier tube detector has a much higher light sensitivity than a photodiode detector. The PMT signal travels through a preamplifier 164 and an A/D converter 166 for display on a display device 167 or to a computer (not shown) for further processing or data logging. A power supply 168 is included to supply a bias voltage to the PMT.

FIG. 13 illustrates a block diagram of another embodiment of an on-line microbial analyzer 170 to measure the microbial content of the aqueous solution being treated. The microbial analyzer shown in FIG. 13 includes a sensor array for measuring a specific microbe, such as *E. coli* or a class of bacteria such as coliforms, etc. In this embodiment, the emission filter 160 and PMT 162 shown in FIG. 12 is replaced by individual avalanche photo diode (APD) bandpass filters 182 and a large area avalanche photo diode (LAAPD) detector array 184. The analyzer 170 preferably includes a broadband light source 172 such as a low pressure mercury lamp or ultraviolet lamp that transmits through an excitation filter 174. The light travels to a water target 176 through a coaxial fiber optic bundle 178, having an outer bundle of transmitted light and an inner bundle of back scattered light from the target 176. The bundle 178 is interfaced to a pipe 179 using a special coupling fixture which allows the bundle to have a water tight seal on the inner surface of the pipe. The analyzer 170 operates by projecting transmitted light into the water target 176. Fluorescent light is back scattered into a receiving inner core of the bundle 178. This light is then transmitted back through the inner core of the bundle to the APD 182 and LAAPD 184. The ADP/LAAPD signal travels through a preamplifier 186 and an A/D converter 188 for display on a display device 190 or to a computer (not shown) for further processing or data logging. A power supply 190 is included to supply a bias voltage to the ADP/LAAPD. The spectrum produced by the sensor array allows for the determination of specific bacterial species population densities using mathematical/statistical algorithms implemented by software in a computer.

As discussed above, the electrodes have been anticipated to be generally uniform plate type electrodes. Such an electrode configuration may have an advantage in design and construction simplicity, but application of such configurations within larger treatment installations may require the use of undesirably high power levels. Also, as the present invention is applied to larger installations providing treatment for greater waste or water flows, it may be desirable to increase the spacing of between the electrodes. It may be desirable to utilize existing levels of power to treat these larger, more widely spaced installations.

Where it is desirable to treat a wastewater or aqueous solution stream, as described above, one objective of the application of an electroionic process to a fluid waste stream or aqueous solution within cell 20 is to produce hydrogen peroxide within the waste stream in accordance with the following chemical reactions, depending on the alkalinity or acidity of the waste stream:

$$O_2 + 2H_2O + 2e^- \rightarrow H_2O_2 + 2OH^- \text{ (Alkaline waste stream)}$$

$$O_2 + 2H^+ + 2e^- \rightarrow H_2O_2 \text{ (Acidic waste stream)}$$

The generation of $H_2O_2$ appears to be a function of current density in an AC electrolytic cell, such as cell 20, shown above. While the existence of this functional relationship is known, the exact nature of the function has not be proven by either experimentation or theory. Current density within the waste stream is known to be a function of both the strength of the electrical field applied to the waste stream and the electrical conductivity of the waste stream, as shown by the equation below:

$$J = E\sigma$$

J—current density in milliamps per square centimeter
E—electrical field strength in millivolts per centimeter
σ—conductivity in Siemens per centimeter Typical ranges of conductivity for aqueous solutions are, for example, between generally 100 to 300 for water in Lake Michigan, up to 2,000 to 3,000 for a concentrated biological solids solution, or as low as 0 for deionized water.

To generate a desired concentration or amount of hydrogen peroxide within an aqueous solution passing within cell 20, AC power source 12 and amplifier 14 need to produce a voltage based on the spacing between electrodes 22 and 24 within cell 20, based on the following equation:

$$E = V/l$$

V—voltage (volts)
l—electrode spacing (meters)

Thus, a larger reactor with wider electrode spacing will require a higher voltage to generate the same amount of hydrogen peroxide within a waste stream in cell 20. The power consumed by the reactor depends on the voltage and the resistance in the current path, as indicated by the following equation:

$$P = V^2/R$$

P—power (watts)
V—voltage (volts)
R—resistance (ohms)

Thus, for a given voltage requirement within cell 20, the power required to generate the voltage will depend on how much resistance is in the electrical circuit path. In cell 20, where the open area of electrodes 22 and 24 has been increased, the resistance will diminish, resulting in greater voltage and thus power required to generate the same amount or concentration of hydrogen peroxide within the aqueous solution. The resistance in cell 20 is determined with the following equation:

$$R = Sl/a$$

R—resistance (ohms)
S—resistivity of electrode material (ohm-meter)
l—electrode spacing (meters)
a—area of electrode (square meters)

While this equation shows that increases in spacing will tend to increase the resistance in the electrical circuit path, areal increases of the electrodes 22 and 24 may have an even greater influence on lowering the resistance. So, larger electrodes spaced further apart in cell 20 may result in an undesirable decrease in overall resistance and a commensurate increase in the power required to generate the same treatment within the waste stream or aqueous solution.

Different approaches may be followed for changing the overall resistance equation to move the balance toward a more desirable power requirement. One approach to increasing the resistance may be to change the material from which electrodes 22 and 24 are formed. By using a material with a greater resistivity, the overall resistance can be increased.

However, it may be desirable to select electrode material based on other considerations, as will be discussed below.

The overall length of electrodes 22 and 24 may be shortened, or held constant while the spacing between them is increased, but this may result in an undesirably short treatment zone within cell 20. A shortened treatment zone may require greater power be applied to generate the desired amount of hydrogen peroxide within the waste stream to accomplish the desired treatment of the waste stream. Alternatively, it may be desirable to increase the spacing while keeping the electrode size the same.

It is anticipated that different materials may be used to form electrodes 22 and 24, and that these different materials may have a catalytic effect on the production of either hydrogen peroxide within cell 20, or the production of elemental hydrogen or oxygen within cell 20. Electrodes 22 and 24 may be formed of a plurality of materials, for example, by interleaving wires of a plurality of materials to form a mesh electrode. In an another example, one or more different materials could be joined (such as by welding, soldering, fusing, adhesives, etc.) to form a single electrode. The catalytic materials anticipated could result in greater or more efficient production of different elements or compounds that have been described above, such as increasing the amount of hydrogen peroxide generated. Alternatively, catalytic materials could be used which encourage the generation of other beneficial compounds within cell 20, such as activated chlorine. In another example, ferrous iron could be incorporated into one or both of electrodes 22 and 24, as the presence of ferrous iron, as noted above, encourages the formation of hydroxyl radicals within the aqueous solution. This may help ensure creation of such radicals when there is a lack of iron content within the waste stream within cell 20, such as when there may be fewer biosolids containing high iron content within the waste stream. Conventional catalytic materials which function in electroionic reactions are known and may be used in electrodes 22 and 24. Alternatively, experimentation with AC power in electroionic reactions, such as described above, may result in the discovery of additional catalytic materials or compounds which may be incorporated into electrodes 22 and 24 or within cell 20.

The reactions described above, for the production of hydrogen peroxide in cell 20, require the presence of elemental oxygen in the aqueous solution to generate hydrogen peroxide, with both the acidic and alkaline equations including elemental oxygen as a precursor material. However, experiments have shown that adding elemental oxygen to the aqueous solution is not necessary to support the generation of hydrogen peroxide within cell 20. While some aqueous solutions may have a certain amount of dissolved oxygen which may be used for these reactions, solutions with a higher concentration of biological solids will likely have little or no dissolved oxygen, such as due to the high BOD (biological oxygen demand) of the waste material within the solution. It is exactly this high BOD that may be desirably treated with cell 20. Thus, it appears that the electroionic process occurring within cell 20 first liberates elemental oxygen through breaking down water. Such electrolysis of water with DC power is well known.

The chemical reaction equations for direct current (DC) electrolysis of water are well established:

At the anode: $2H_2O(l) = O_2(g) + 4H+(aq) + 4e-$

At the cathode: $4H_2O(l) + 4e- = 2H_2(g) + 4OH-(aq)$ l—liquid g—gas aq—aqueous (ionic)

Source: Shakhashiri, B. Z., *Chemical Demonstrations, A Handbook for Teachers of Chemistry*, University of Wisconsin—Madison, 1992.

In a DC electrolytic reactor, hydrogen and oxygen may be collected at the cathode and anode respectively. In a high frequency (20 kHz-450 kHz) AC electroionic process, as described herein, both hydrogen and oxygen will be generated in accordance with the above equations throughout cell 20. Such multiple gas generation has been observed many times in experimental testing. Some of the elemental hydrogen and oxygen generated by the electrolysis of water within cell 20 may emerge from the waste stream and be collected as hydrogen and oxygen gases. Separation of the hydrogen gas from the oxygen gas can be accomplished by well-established separation processes known in chemical engineering technology.

Because the chemical reactions for hydrogen generation occur throughout cell 20 rather than at one of the electrodes 22 or 24 alone, there is reason to believe that hydrogen generation will be more efficient in an electroionic reactor such as cell 20. Also, oxygen generation is similarly occurring throughout cell 20. With hydrogen and oxygen present through cell 20, it appears that generation of hydrogen peroxide may be supported throughout cell 20 within the aqueous solution. However, since the acidic hydrogen peroxide equation above consumes equal amounts of hydrogen and oxygen, and the alkaline equation consumes only elemental oxygen, a net surplus of hydrogen should result from the electroionic processes within cell 20. This surplus elemental hydrogen may be bubbled out of cell 20 and collected, perhaps as a co-generation byproduct.

While the exact chemical mechanism is not known, the following equation may be resulting in hydrogen generation within cell 20:

$2H_2O \rightarrow H_2 + H_2O_2$

With either of these equations, the intermediate generation of oxygen is not necessary to support the generation of hydrogen peroxide. Note that both equations result in the generation of excess amounts of elemental or molecular hydrogen, which may be bubbled out of solution within cell 20 or downstream of cell 20 and captured, as described above.

Without knowing the exact chemical reaction or equations, or combinations of different reactions and equations, it is clear that the use of cell 20 to generate hydrogen peroxide in an aqueous solution within cell 20 will result in the production of excess hydrogen which may be collected and captured. The hydrogen may be mixed with other gases but the separation of different constituent gases in a sample are well known.

Free radicals of both oxygen and hydrogen may be produced with the aqueous solution, along with other free radicals. The presence of such free radicals within the solution may be used to aid the development of other desirable or useful chemicals or compounds within the aqueous solution. Alternatively, the presence of such free radicals may be used to generate useful intermediate products within the aqueous solution which may in turn result in the generation of additional useful or valuable compounds within the aqueous solution.

Additional elemental or molecular oxygen may be generated within the aqueous solution through the breakdown of hydrogen peroxide that results from the exposure of the solution to the electrical and ionic currents within the flow cell. Such an oxygen liberating reaction may serve to reduce the concentration of hydrogen peroxide in the water and may be stimulated through the use of reagents or catalytic materials to promote the generation of greater amounts of oxygen for collection and sale as a valuable by-product or primary goal f the reaction. It is anticipated that production of oxygen using the methods and apparatus described herein may result is a fairly high degree of cost and energy efficiency as compared to conventional methods and machines for the production of oxygen.

It is anticipated that this electroionic production of hydrogen may be increased through the selection of appropriate catalytic materials as part of electrodes 22 and 24. It may also been determined that selecting different optimal voltages or frequencies, or configurations of plate electrodes 22 and 24 may result in greater production within cell 20 of hydrogen and/or oxygen. This greater production of either gas may be maintained without impacting production of a necessary or desired quantity of hydrogen peroxide within the aqueous solution.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A method of generating molecular hydrogen from an aqueous solution, the method comprising:
    providing a high frequency AC power source coupled to a flow cell, the power source including a signal generator and a power amplifier;
    generating a high frequency AC signal with the signal generator;
    amplifying the signal with the power amplifier;
    transmitting the amplified signal to the flow cell and creating an electromagnetic field and an ionic current flow in the flow cell; and,
    passing the aqueous solution through the flow cell and exposing the aqueous solution to the electromagnetic field and the ionic current flow.

2. The method of claim 1, further providing the AC power source is coupled to the flow cell through a pair of electrodes positioned on opposing sides of the flow cell.

3. The method of claim 2, wherein each of the electrodes formed at least partially of a catalytic material selected to increase production of the molecular hydrogen.

4. The method of claim 1, wherein the molecular hydrogen generated from the aqueous solution is captured as a gas.

5. A method of generating molecular oxygen from an aqueous solution, the method comprising:
    providing a high frequency AC power source coupled to a flow cell, the power source including a signal generator and a power amplifier;
    generating a high frequency AC signal with the signal generator;
    amplifying the signal with the power amplifier;
    transmitting the amplified signal to the flow cell and creating an electromagnetic field and an ionic current flow in the flow cell; and,
    passing the aqueous solution through the flow cell and exposing the aqueous solution to the electromagnetic field and the ionic current flow.

6. The method of claim 5, further providing the AC power source is coupled to the flow cell through a pair of electrodes positioned on opposing sides of the flow cell and wherein each of the electrodes formed at least partially of a catalytic material selected to increase production of the molecular oxygen.

7. The method of claim 5, wherein the molecular oxygen generated from the aqueous solution is captured as a gas.

8. A molecular hydrogen generation apparatus comprising:
    a flow cell through which an aqueous solution is flowing;
    a high frequency AC power source;
    a pair of spaced apart electrodes positioned on opposite sides of the flow cell so that the aqueous solution of flowing between the electrodes, the electrodes in electrical contact with the aqueous solution and coupled to the AC power source;
    the AC power source generating a signal and transmitting that signal to the electrodes to generate an electromagnetic field and an ionic current within the aqueous solution in the flow cell.

9. The molecular hydrogen generation apparatus of claim 8, the AC power source further comprising a signal generator and a power amplifier coupled to the signal generator to amplify the signal.

10. The molecular hydrogen generation apparatus of claim 9, the AC power source further comprising an impedance matching transformer coupled to the signal amplifier and to the electrodes in the flow cell.

11. A molecular oxygen generation apparatus comprising:
    a flow cell through which an aqueous solution is flowing;
    a high frequency AC power source;
    a pair of spaced apart electrodes positioned on opposite sides of the flow cell so that the aqueous solution of flowing between the plate electrodes, the electrodes in electrical contact with the aqueous solution and coupled to the AC power source;
    the AC power source generating a signal and transmitting that signal to the electrodes to generate an electromagnetic field and an ionic current within the aqueous solution in the flow cell.

12. The molecular oxygen generation apparatus of claim 11, the AC power source further comprising a signal generator and a power amplifier coupled to the signal generator to amplify the signal.

13. The molecular oxygen generation apparatus of claim 12, the AC power source further comprising an impedance matching transformer coupled to the signal amplifier and to the electrodes in the flow cell.

14. A method of generating hydrogen peroxide from an aqueous solution, the method comprising:
    providing a high frequency AC power source coupled to a flow cell, the power source including a signal generator and a power amplifier;
    generating a high frequency AC signal with the signal generator;
    amplifying the signal with the power amplifier;
    transmitting the amplified signal to the flow cell and creating an electromagnetic field and an ionic current flow in the flow cell; and,
    passing the aqueous solution through the flow cell and exposing the aqueous solution to the electromagnetic field and the ionic current flow;
    wherein the aqueous solution includes negligible amounts of dissolved oxygen prior to exposure to the electromagnetic field and the ionic current flow.

* * * * *